(12) United States Patent
Kano et al.

(10) Patent No.: US 10,007,386 B2
(45) Date of Patent: Jun. 26, 2018

(54) INPUT DEVICE AND PROGRAM

(71) Applicant: Murata Manufacturing Co., Ltd., Nagaokakyo-shi, Kyoto-fu (JP)

(72) Inventors: Hidekazu Kano, Nagaokakyo (JP); Hiroaki Kitada, Nagaokakyo (JP); Takafumi Inoue, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days. days.

(21) Appl. No.: 15/083,681

(22) Filed: Mar. 29, 2016

(65) Prior Publication Data

US 2016/0246413 A1 Aug. 25, 2016

Related U.S. Application Data

(63) Continuation of application No. PCT/JP2014/076756, filed on Oct. 7, 2014.

(30) Foreign Application Priority Data

Oct. 9, 2013 (JP) .................................. 2013-211508

(51) Int. Cl.
*G06F 3/044* (2006.01)
*G06F 1/16* (2006.01)
*G06F 3/041* (2006.01)

(52) U.S. Cl.
CPC ............ *G06F 3/044* (2013.01); *G06F 1/1626* (2013.01); *G06F 1/1684* (2013.01); *G06F 3/0412* (2013.01); *G06F 2203/04105* (2013.01)

(58) Field of Classification Search
CPC ................. G06F 1/1626; G06F 1/1684; G06F 2203/04105; G06F 3/0412; G06F 3/044
(Continued)

(56) References Cited

U.S. PATENT DOCUMENTS

2010/0302212 A1* 12/2010 Weber ................. G06F 3/04886
345/178
2011/0069024 A1* 3/2011 Kim ......................... G06F 3/01
345/173

(Continued)

FOREIGN PATENT DOCUMENTS

JP 2011253517 A 12/2011
JP 2012199888 A 10/2012

(Continued)

OTHER PUBLICATIONS

International Search Report issued for PCT/JP2014076756, dated Jan. 6, 2015.

(Continued)

*Primary Examiner* — Tony Davis
(74) *Attorney, Agent, or Firm* — Arent Fox LLP

(57) ABSTRACT

A mobile terminal device receives an input of a pressing operation when an operation surface is pressed. A pressing amount detecting unit detects whether or not the operation surface has been pressed. A grip determining unit determines whether or not the housing has been gripped by a user. A threshold adjusting unit adjusts a press detection sensitivity of the pressing amount detecting unit when the housing is gripped by the user and when the housing is not gripped by the user. By this means, it is possible to provide an input device which adequately detects a pressing operation, and a program which is executed by this input device.

19 Claims, 7 Drawing Sheets

(58) Field of Classification Search
USPC ................................................ 345/170–176
See application file for complete search history.

(56) References Cited

U.S. PATENT DOCUMENTS

| | | | |
|---|---|---|---|
| 2011/0122085 A1* | 5/2011 | Chang | G06F 1/1626 |
| | | | 345/174 |
| 2013/0057499 A1* | 3/2013 | Ando | G06F 3/038 |
| | | | 345/173 |
| 2013/0093689 A1* | 4/2013 | Papakipos | G06F 1/1626 |
| | | | 345/173 |
| 2014/0104235 A1 | 4/2014 | Matsuda | |
| 2015/0212699 A1* | 7/2015 | Weksler | G06F 3/04842 |
| | | | 715/765 |
| 2015/0268747 A1* | 9/2015 | Kim | G06F 3/0488 |
| | | | 345/173 |
| 2016/0231868 A1* | 8/2016 | Saiki | G06F 3/0433 |

FOREIGN PATENT DOCUMENTS

| | | |
|---|---|---|
| JP | 2013054462 A | 3/2013 |
| WO | WO 2012160867 A1 | 11/2012 |

OTHER PUBLICATIONS

Written Opinion of the International Searching Authority issued for PCT/JP2014/076756, dated Jan. 6, 2015.

\* cited by examiner

INPUT DEVICE AND PROGRAM

CROSS REFERENCE

The present application is a continuation of International application No. PCT/JP2014/076756, filed Oct. 7, 2014, which claims priority to Japanese Patent Application No. JP2013-211508, filed Oct. 9, 2013, the entire contents of each of which are incorporated herein by reference.

TECHNICAL FIELD

The present invention relates to an input device, non-transitory storage medium having a program stored thereon and a process which detects when a sufficient pressing force has been applied to an operation panel based upon whether the input device is being gripped by a user.

BACKGROUND ART

In recent years, many electronic devices such as mobile telephones have touch panels which allow users to intuitively perform operations. In case of an electronic device which includes a touch panel, a user generally operates the electronic device by holding a main body with one hand, and using a finger on the same or an opposite hand to touch an icon displayed on a display screen. For example, Japanese Patent Application Laid-Open No. 2012-199888 discloses a mobile terminal device which adopts a display mode of determining a user's dominant hand and displaying icons in such a manner that a touch operation can be easily performed according to the user's dominant hand to further increase operability of an operation performed by using this touch panel. The mobile terminal device disclosed in Japanese Patent Application Laid-Open No. 2012-199888 can increase users' operability.

SUMMARY OF THE INVENTION

Some electronic devices for which touch panels are used sense a pressing force (pressing amount) with respect to the touch panel, and accept an operation corresponding to this pressing force (referred to as a pressing operation below). However, a pressing force with respect to the touch panel differs according to a user's posture taken when a touch operation is performed on an electronic device, i.e., when, for example, a touch operation is performed by the finger with an electronic device placed on a flat surface such as a floor or desk or when a touch operation is performed while the electronic device is held in the user's hand. Since the amount of force applied will vary as a function of whether the device is placed on a flat surface or held in the user's hand, there is a concern that the pressing force applied by the user will not be constant and that the electronic device will not accurately determine whether the pressing operation has been performed. This problem cannot be solved by Japanese Patent Application Laid-Open No. 2012-199888.

It is therefore an object of the present invention to provide an input device which adequately detects a pressing operation, and a program which is executed by this input device.

According to one aspect of the invention, the input device includes:
a housing having opposed side surfaces;
an operation panel extending between the opposed side surfaces and coupled to the housing;
means for:
 (a) selecting a threshold level of pressing force as a function of whether a user has gripped the opposed side surfaces of the housing and where the user touches a surface of the operation panel;
 (b) determining if the user has applied a pressing force to the surface of the operation panel which is greater than the threshold level of pressing force; and, if so
 (c) carrying out a user initiated process.

In accordance with a further aspect of the invention, the means:
 (a) selects the threshold level of pressing force to be at a first level when the user has gripped the opposed side surfaces of the housing and touches a predetermined portion of the surface of the operation panel; and
 (b) selects the threshold level of pressing force to be a second level, lower than the first level, when the user has gripped the opposed side surfaces but has not touched the predetermined portion of the surface of the operation panel.

In accordance with yet a further aspect of the invention, the means also selects the threshold level of pressing force to be at the second level when the user has not gripped the opposed side surfaces of the housing.

In accordance with a further aspect of the invention, the means selects the threshold force in response to the user touching the surface of the operation panel.

According to a further aspect of the invention, the press detecting means generates an output signal indicating that the operation panel has been pressed when the pressing force applied to the operation panel is greater than the threshold level of pressing force.

According to yet another aspect of the invention, the press detecting means includes a piezoelectric film provided along one surface of the operation panel. The fils is preferably made of a chiral polymer and, more preferably a polylactic acid or a poly-L-lactic acid.

In yet a further aspect of the invention, the grip detection means includes sensors located on opposite edges of the housing.

In a further aspect of the invention the threshold section means selects the threshold level of pressing force as function of whether the user has gripped the housing and whether the user's thumb has touched the operation panel in an area near a corner of the operation panel. The threshold selection means preferably selects a lower threshold level of pressing force when the user is not gripping the housing than when the user is gripping the housing.

The invention is also directed towards a non-transitory computer readable medium having stored thereon a computer program which, when run on a processor:
 determines whether a user has gripped the housing and selecting a threshold force as a function of such determination;
 determines if the user has applied a pressing force to the operation panel which is greater than the threshold force.

In a further aspect of the invention the computer program determines which of a plurality of predetermined gripping modes has been applied to the housing and the threshold level of pressing force is determined as a function of the so determined gripping mode.

In a further aspect of the invention the computer program generates an output signal indicating that the operation panel has been pressed when the pressing force applied to the operation panel is greater than the threshold level of pressing force.

In yet a further aspect of the invention the computer program selects the threshold level of pressing force as function of whether the user has gripped the housing and whether the user's thumb has touched the operation panel in an area near a corner of the operation panel.

In another aspect of the invention the computer program selects a lower threshold level of pressing force when the user is not gripping the housing than when the user is gripping the housing.

The invention is also directed towards a process for determining whether a pressing force of sufficient magnitude has been applied to an operation panel of a housing, the process comprising:

determining whether a user has gripped the housing and selecting a threshold force as a function of the determination;
  determining if the user has applied a pressing force to the operation panel which is greater than the threshold force In another aspect of the invention the determination of whether the user has gripped the housing determines which of a plurality of predetermined gripping modes has been applied to the housing and the threshold level of pressing force is determined as a function of the so determined gripping mode.

In yet another aspect of the invention an output signal indicating that the operation panel has been pressed is generated when the pressing force applied to the operation panel is greater than the threshold level of pressing force.

In a further aspect of the invention the threshold level of pressing force is determined as function of whether the user has gripped the housing and whether the user's thumb has touched the operation panel in an area near a corner of the operation panel. Preferably a lower threshold level of pressing force is selected when the user is not gripping the housing than when the user is gripping the housing.

Since the presence of a pressing operation is determined as a function of a threshold level of pressing force selected as a function of whether the user is gripping the housing of the input device, it is possible to more accurately determine whether the user has made a desired input into the input device.

As noted above, in the input device according to the present invention, the press detecting means preferably includes a piezoelectric film of a flat film shape which is provided along one of a first principal surface and a second principal surface of the operation panel and is made of a chiral polymer. The chiral polymer is preferably made of polylactic acid.

When, for example, PVDF (polyvinylidene fluoride) is used for the piezoelectric film, there is a concern that a temperature of the user's finger is transmitted to the piezoelectric film, and influences detection performed by the piezoelectric film. However, polylactic acid which does not produce pyroelectricity is used, so that the piezoelectric film can precisely detect a press.

As further noted above, the piezoelectric film is more preferably made of poly-L-lactic acid.

When, for example, PVDF (polyvinylidene fluoride) is used for the piezoelectric film, there is a concern that a temperature of the user's finger is transmitted to the piezoelectric film, and influences detection performed by the piezoelectric film. However, poly-L-lactic acid which does not produce pyroelectricity is used, so that the piezoelectric film can precisely detect a press.

According to the present invention, it is possible to adequately detect a press by changing a sensitivity for detecting a press based on whether or not a housing is gripped.

MODE FOR CARRYING OUT THE INVENTION

A preferred embodiment of an input device according to the present invention will be described below with reference to the drawings. In the following embodiment, a mobile terminal device which includes the input device according to the present invention will be described as an example. The mobile terminal device is a mobile electronic device which enables an operation via a touch panel, and is, for example, a mobile telephone, a music player or a digital camera.

Figure 1:
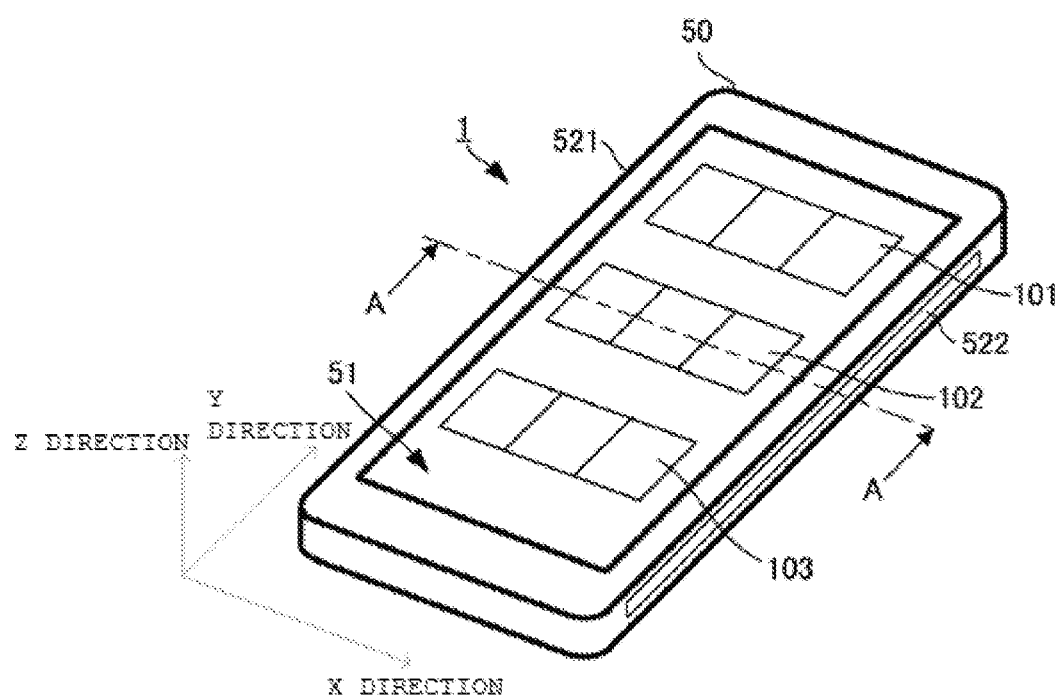
FIG. 1 is an external appearance perspective view of a mobile terminal device according to an embodiment.
Figure 2:
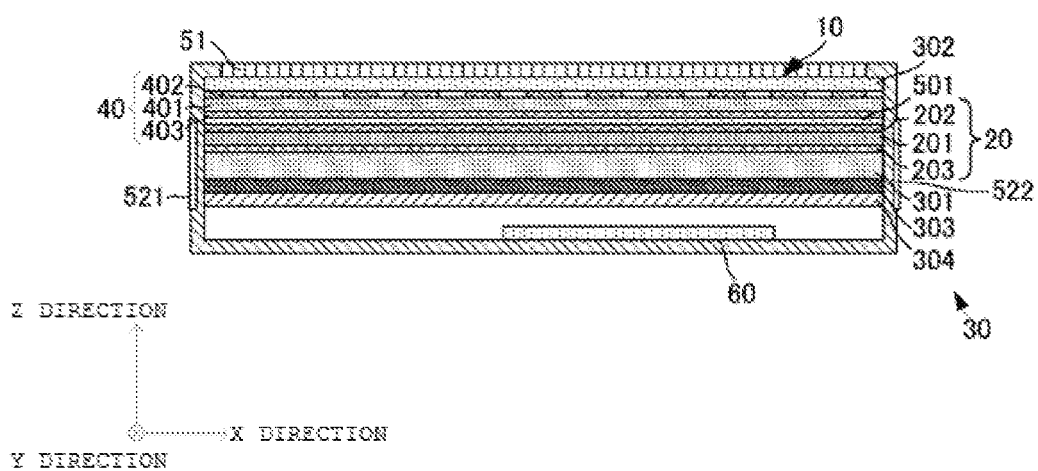
FIG. 2 is a sectional view taken along a line A-A in FIG. 1.

FIG. 1 is an external appearance perspective view of a mobile terminal device 1 according to the present embodiment. FIG. 2 is a sectional view cut along a line A-A in FIG. 1.

The mobile terminal device 1 has a substantially cuboid shaped housing 50. Hereinafter, description will be made in which a width direction of the housing 50 will be referred to as an X direction, a length direction will be referred to as a Y direction and a thickness direction will be referred to as a Z direction (see the x-y-z axes shown in FIGS. 1 and 2). Further, the X direction will be referred to as the horizontal direction of the mobile terminal device 1, and the Y direction will be also referred to as the vertical direction of the mobile terminal device 1. In the disclosed embodiment the length of the housing 50 in the X direction is shorter than a length of the housing 50 in the Y direction.

An operation surface 51 is coupled to the housing 50 and accepts both a touch operation and a pressing operation of a user. The operation surface 51 corresponds to an operation panel according to the present embodiment. In the housing 50 and at a back surface side of the operation surface 51, a display input unit 10 (FIG. 2) which detects a touch operation and a pressing operation is provided, and the operation surface 51, which is preferably made of resin and is provided to cover a display region of the display input unit 10, serves as a protection cover.

The touch operation refers to an operation wherein a user provides an input to the device 1 by touching the operation surface 51 using his or her finger. "Touching" is used herein to include both the case where the user's finger actually touches the operation surface 51 and the case where the user's finger is sufficiently close to the operation surface 51 to create a detectable capacitance between the operation surface 51 and the user's finger. As used herein, a "pressing operation" refers to an operation wherein the user's finger presses against the operation surface 51 (which is preferably made of resin). As used herein, a "pressing amount" refers to a parameter which indicates how much the operation surface 51 is pushed by the pressing operation.

The display input unit 10 acts as an input device and includes a press sensor unit 20, a display panel unit 30 and a position detection sensor unit 40. A mounting substrate (not illustrated) is disposed closer to a back surface side of the display input unit 10, and an arithmetic circuit module 60 is mounted on this mounting substrate.

The display panel unit 30 preferably includes a liquid crystal panel 301 having a flat shape, a top surface polarizing plate 302, a back surface polarizing plate 303 and a backlight 304. A liquid crystal orientation state of the liquid crystal panel 301 changes to form a predetermined image pattern when a drive signal is applied. The top surface polarizing plate 302 and the back surface polarizing plate 303 are disposed to sandwich the liquid crystal panel 301 therebetween. The backlight 304 is disposed at a side opposite to the liquid crystal panel 301 across the back surface polarizing plate 303.

Between the liquid crystal panel 301 and the top surface polarizing plate 302 of the display panel unit 30, the press sensor unit 20 and the position detection sensor unit 40 are disposed. The position detection sensor unit 40 is positioned immediately below the top surface polarizing plate 302, and the press sensor unit 20 is positioned immediately above the liquid crystal panel 301. A translucent insulation layer 501 is formed between the press sensor unit 20 and the display panel unit 30. Alternatively, the press sensor unit 20 and the position detection sensor unit 40 may be provided between the top surface polarizing plate 302 and the operation surface 51.

The display panel unit 30 displays operation images 101, 102 and 103 (FIG. 1). The operation surface 51, the press sensor unit 20 and the position detection sensor unit 40 are all translucent, so that the user can view the operation images 101, 102 and 103 through the operation surface 51 and the like. The operation images 101, 102 and 103 are associated with various operations of the mobile terminal device 1 such as character input or activation of a predetermined function (operation).

The position detection sensor unit 40 includes a flat, transparent insulating substrate 401 preferably made of a dielectric material which does not have birefringence. A plurality of translucent electrodes 402 are formed on one surface of the insulating substrate 401 and a plurality of translucent electrodes 403 are formed on the other surface. Electrodes 402 are elongated in the Y direction and disposed at intervals along the X direction. Electrodes 403 are elongated in the X direction and disposed at intervals along the Y direction. With this arrangement a unique pair of electrodes 402 and 403 will cross one another at a 90 degree angle at a respective location along the x-y axis.

When a user's finger or the like approaches the operation surface 51 in the area where a respective pair of electrodes cross, there will be a change in capacitance. This change is detected by the arithmetic circuit module 60 which is connected to each of the electrodes 402 and 403 by wiring (not shown). In this way the arithmetic circuit module 60 detects the location on the operation surface 51 that has been touched as a function of this change in capacitance.

When arithmetic circuit module 60 has detected a touch position and when one of the operation images 101, 102 and 103 is displayed at this touch position, the arithmetic circuit module 60 determines that the operation image displayed at this position has been selected by the user. Further, the arithmetic circuit module 60 executes processing associated with the selected operation image.

The press sensor unit 20 includes a piezoelectric film 201 having a flat film shape. Electrodes 202 and 203 are formed on opposite flat surfaces of the piezoelectric film 201. The electrodes 202 and 203 are formed on nearly the entirety of the top and bottom surfaces of the piezoelectric film 201.

The piezoelectric film 201 is preferably made of chiral polymers. In the present embodiment, for the chiral polymers, polylactic acid (PLA) is used and, more particularly, poly-L-lactic acid (PLLA) is used. PLLA is uniaxially stretched. The chiral polymers have higher transparency than that of PVDF, and by making the piezoelectric film 201 of the chiral polymers, it is easy to view an image displayed on the display panel unit 30.

PLLA formed by chiral polymers has a main chain which adopts a spiral structure. The PLLA has piezoelectricity when the PLLA is uniaxially stretched and its molecules are oriented. Further, the uniaxially stretched PLLA produces electric charges when the surface of the piezoelectric film 201 is pressed. The amount of electric charges that will be produced depends on the amount the surface is displaced in a direction orthogonal to the planar surface according to a pressing amount, that is, as a function of the pressing amount.

Further, PLLA produces piezoelectricity by molecule orientation processing such as stretching, and does not need to be subjected to polling processing as is required when using other polymers such as PVDF or piezoelectric ceramics. That is, the piezoelectricity of the PLLA which does not belong to ferroelectrics does not appear as a result of ion polarization unlike ferroelectrics such as PVDF and PZT, but derives from a spiral structure which is a characteristic structure of molecules. Hence, the PLLA does not have pyroelectricity produced in piezoelectric bodies of the other ferroelectrics. Further, the PVDF or the like shows a temporal fluctuation of a piezoelectric constant, and the piezoelectric constant is remarkably lowered depending on cases. However, the piezoelectric constant of the PLLA is temporarily very stable. Consequently, it is possible to detect displacement caused by a press with a high sensitivity without an influence of the surrounding environment.

For the electrodes 202 and 203, it is suitable to use one of inorganic electrodes such as ITO, ZnO, silver nanowires, carbon nanotubes and graphene, and an organic electrode whose main component is polythiophene and polyaniline. By using these materials, it is possible to form a conductor pattern having high translucency. By providing these electrodes 202 and 203, it is possible to obtain as a potential difference the electric charges produced by the piezoelectric film 201, and to output to the outside a pressing amount detection signal of a voltage value corresponding to the pressing amount. The pressing amount detection signal is outputted to the arithmetic circuit module 60 via a wiring which is not illustrated. The arithmetic circuit module 60 calculates the pressing amount based on the pressing amount detection signal.

When the arithmetic circuit module 60 has calculated the pressing amount and when the pressing amount exceeds a predetermined threshold, the arithmetic circuit module 60 determines that a pressing operation has been applied to the operation surface 51, and executes preset processing. In contrast, when the calculated pressing amount does not exceed the threshold, the arithmetic circuit module 60 does not determine that a pressing operation has occurred even if the user presses the operation surface 51.

Processing executed when a pressing operation has been detected is not particularly limited. The processing may include switching to a mail creation screen when, for example, the user selects an operation image by performing a touch operation and a mail application is activated, and when the user performs a pressing operation. Further, processing may include enlarging a displayed map when the user performs a pressing operation in a state where a map application is activated.

Touch detecting units 521 and 522 are provided on opposing side surfaces of the housing 50 in the X direction. These touch detecting units 521 and 522 are rectangular electrode plates which are elongated in the Y direction. The arithmetic circuit module 60 detects a change in a capacitance produced when the user touches the touch detecting units 521 and 522, and determines whether or not the housing 50 is being gripped by the user. Further, when the housing 50 is gripped by the user, the arithmetic circuit module 60 determines a user's gripping mode of the housing 50 as a function of whether or not a change in the capacitance produced between those electrodes 402 and 403 located near a corner of the operation surface 51 is at least a certain value. The arithmetic circuit module 60 can determine a user's operation mode of the mobile terminal device 1 based on this determination.

Figure 3:
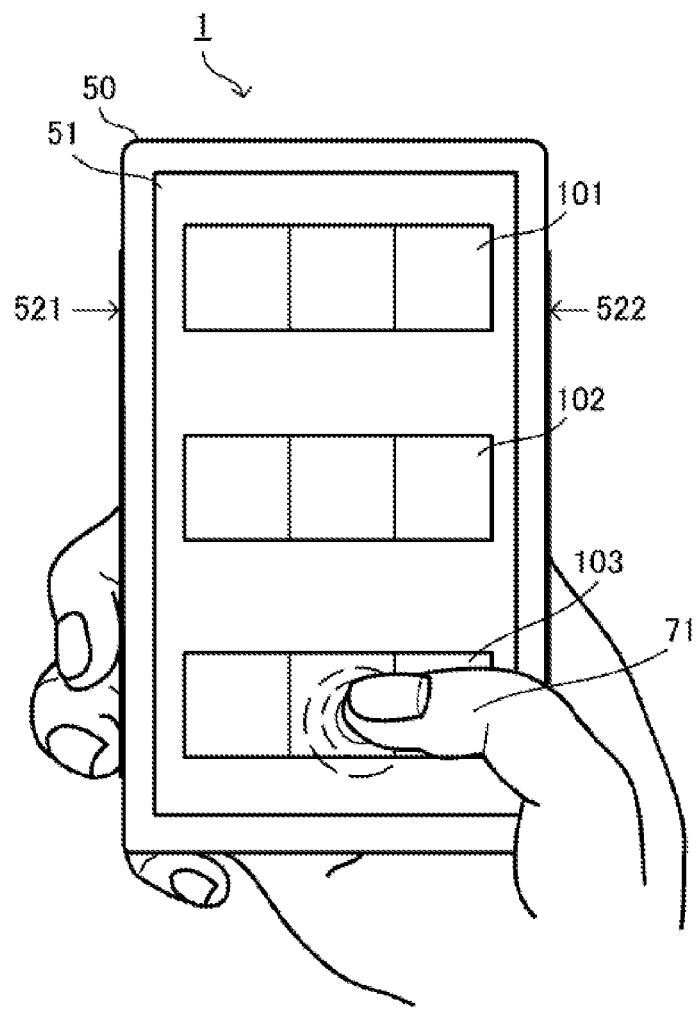
FIG. 3 is a view for explaining an operation mode of the mobile terminal device according to the embodiment.
Figure 4:
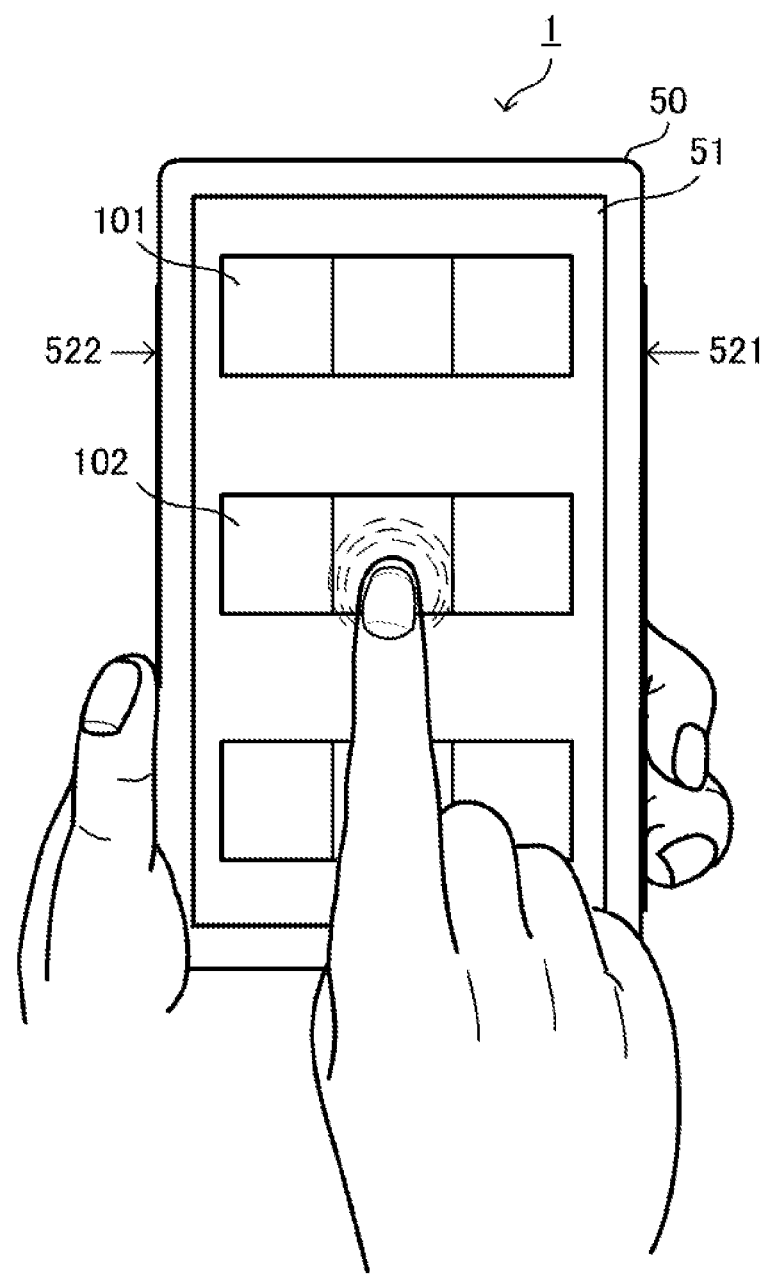
FIG. 4 is a view for explaining the operation mode of the mobile terminal device according to the embodiment.
Figure 5:
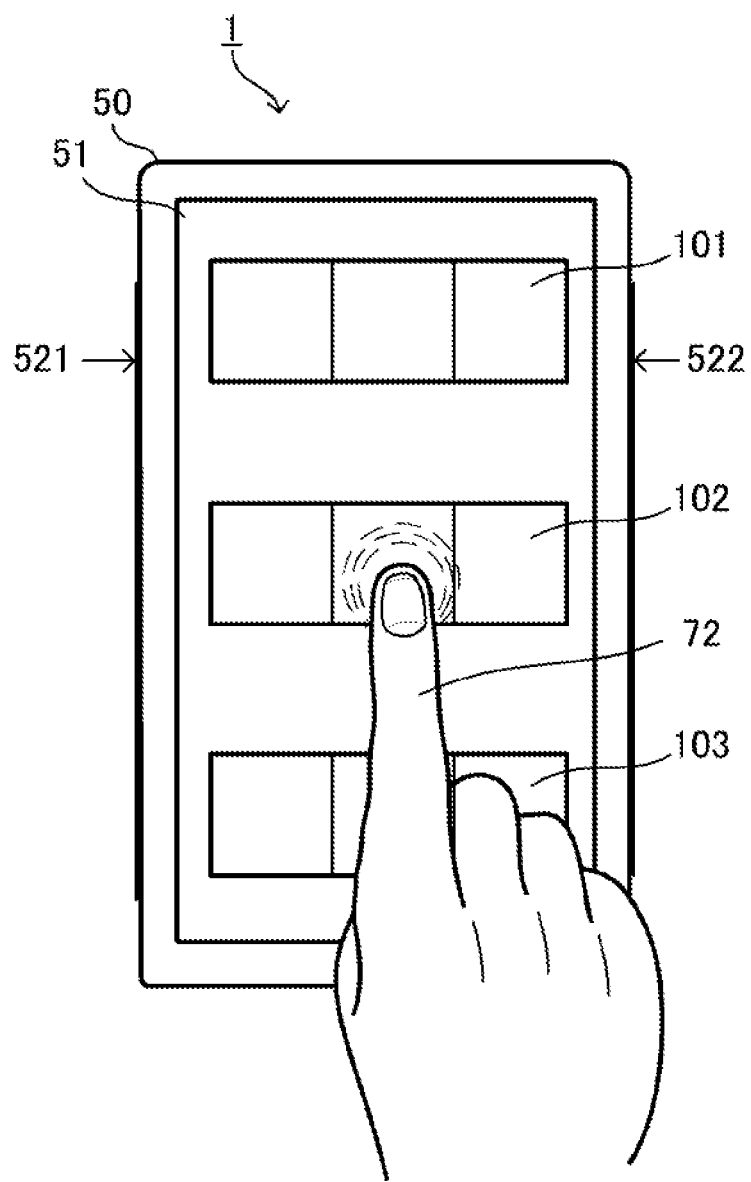
FIG. 5 is a view for explaining the operation mode of the mobile terminal device according to the embodiment.

FIGS. 3, 4 and 5 are views for explaining the operation mode of the mobile terminal device 1 according to the present embodiment.

When it has determined that the user is gripping the housing 50 based on the change in the capacitance in the touch detecting units 521 and 522, the arithmetic circuit module 60 determines that an operation mode is one of the operation modes illustrated in FIG. 3 or FIG. 4. The operation mode illustrated in FIG. 3 is an operation mode wherein the user performs a touching operation and a pressing operation using the thumb 301 of his or her gripping hand (i.e., the hand which is gripping the mobile terminal device 1). The operation mode illustrated in FIG. 4 is an operation mode wherein the user performs a touch operation using a finger of the hand which is not gripping the mobile terminal device 1.

In case where the arithmetic circuit module 60 has determined that the user grips the housing 50 and when a change in the capacitance produced between the electrode pairs 402 and 403 disposed near the corner of the operation surface 51 is a certain value or more, the arithmetic circuit module 60 determines that the operation mode is the operation mode illustrated in FIG. 3. In case of the operation mode illustrated in FIG. 3, a ball of a thumb 71 of the right hand which grips the housing 50 covers the vicinity of the corner of the operation surface 51. Hence, near the corner of the operation surface 51, a capacitance is produced between the operation surface 51 and the ball of the thumb 71, and this capacitance is detected by the electrode pairs in the vicinity of the ball of the thumb 71. Thus, by detecting the change in the capacitance near the corner of the operation surface 51, it is possible to determine whether the operation mode is in the operation mode shown in FIG. 3 or in the operation mode shown in FIG. 4.

In addition, by providing pluralities of touch detecting units 521 and 522 and determining which one of the touch detecting units 521 and 522 the finger of the hand or a palm of the user touches, it may be possible to determine whether an operation mode is in a state in FIG. 3 or in a state in FIG. 4. Further, the capacitive touch detecting units 521 and 522 according to the present embodiment are only exemplary components. Any other known or future developed sensors such as pressure-sensitive sensors, membrane switches and the like can also be used in lieu of capacitive sensors.

When determining based on the change in the capacitance in the touch detecting units 521 and 522 that the user is not gripping the housing 50, the arithmetic circuit module 60 determines that an operation mode is the operation mode illustrated in FIG. 5. The operation mode illustrated in FIG. 5 is an operation mode that the user places the mobile terminal device 1 on a flat surface such as a desk or a floor, and performs a touch operation and a pressing operation using the forefinger 302 of either the right hand or the left hand.

The arithmetic circuit module 60 determines whether the operation mode is the operation mode shown in FIG. 3, FIG. 4 or FIG. 5, and adjusts the detection sensitivity of the pressing operation as a function thereof. Upon comparison between a case where the pressing operation is performed using the finger of the hand which grips the housing 50 of the mobile terminal device 1 and a case where the pressing operation is performed using the finger of the hand which does not grip the mobile terminal device 1, the pressing force for pressing the operation surface 51 differs in each case. More particularly, where the pressing operation is performed by the finger of the hand which grips the mobile terminal device 1, the pressing force is greater since the housing 50 can be strongly gripped. However, in case where the pressing operation is performed by the finger which does not grip the housing, the pressing force is small since a pressing operation is performed without gripping the housing 50. Further, the pressing operation is detected by the arithmetic circuit module when the pressing amount exceeds a predetermined threshold. Therefore, when the user performs a pressing operation (i.e., has pressed the operation surface 51 to some degree) with a pressing force below the threshold, the pressing operation is not detected (accepted). Hence, the arithmetic circuit module 60 enhances detection precision of the pressing operation irrespective of the particular operation mode (FIGS. 3, 4 and 5) by changing the threshold used for pressing operation detection determination according to the operation mode.

Figure 6:
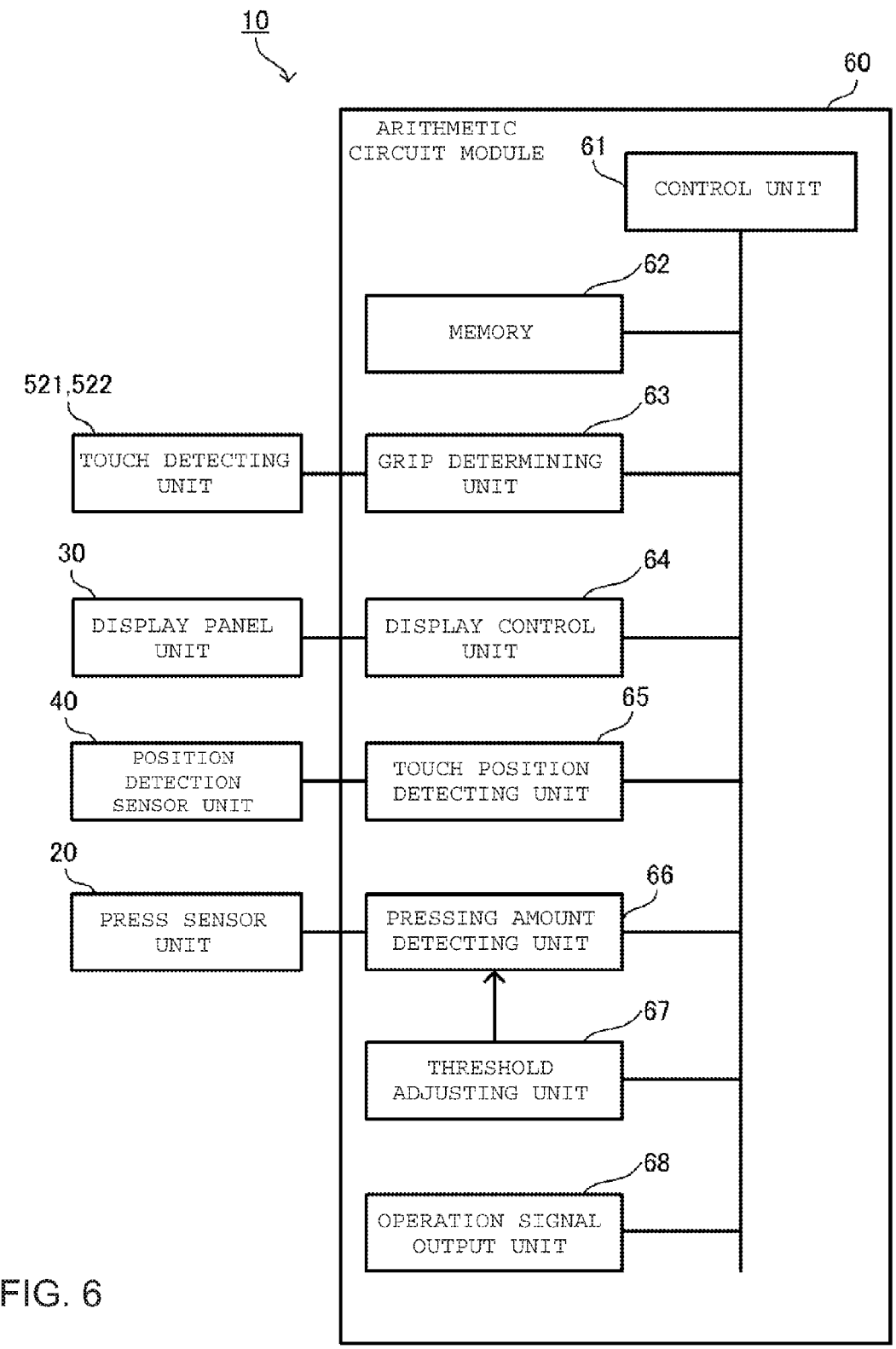
FIG. 6 is a block diagram illustrating a configuration of an arithmetic circuit module.

FIG. 6 is a block diagram illustrating a configuration of arithmetic circuit module 60. The arithmetic circuit module 60 includes a control unit 61, a memory 62, a grip determining unit 63, a display control unit 64, a touch position detecting unit 65, a pressing amount detecting unit 66, a threshold adjusting unit 67 and an operation signal output unit 68. Units 63-68 are preferably executed by a computer program running an control unit 61.

The control unit 61 is a CPU or the like, and controls the entire operation of the arithmetic circuit module 60 according to a program stored in the memory 62. The memory 62 is a RAM, a ROM and the like, stores a control program and successively stores an arithmetic processing result and the like.

The grip determining unit 63 determines whether or not the housing 50 is gripped by the user, based on a change in the capacitance in the touch detecting units 521 and 522. When the housing 50 is gripped by the user, the grip determining unit 63 outputs this determination result to the control unit 61.

The display control unit 64 controls image display of the display panel unit 30. When, for example, receiving an input of a control signal from the control unit 61, the display control unit 64 causes the display panel unit 30 to display the operation images 101 to 103 and the like, and performs the above display change processing.

The touch position detecting unit 65 is connected to the press sensor unit 20 of the display input unit 10. The touch position detecting unit 65 receives an input of a plurality of capacitance detection signals from the position detection sensor unit 40. As described above, each capacitance detection signal is outputted from a respective pair of crossing electrodes 402 and 403 in which the capacitance is changed upon a user's touch operation. The touch position detecting unit 65 detects that pair of the electrodes 402 and 403 whose signal level is the highest, from a plurality of capacitance detection signals. In the memory 62, information (position coordinate) in which each pair of the electrodes 402 and 403 and an operation input detection position are associated with each other is stored. The touch position detecting unit 65 reads from the memory 62 a position coordinate which is associated with the pair whose signal level is the highest, and outputs the position coordinate to the control unit 61.

When the grip determining unit 63 determines that the housing 50 is gripped by the user and the touch position detecting unit 65 detects a change in the capacitance near the corner of the operation surface 51, the control unit 61 determines that an operation mode is the operation mode illustrated in FIG. 3. Further, when grip determining unit 63 determines that the housing 50 is gripped by the user and the touch position detecting unit 65 does not detect a change in the capacitance near the corner of the operation surface 51, the control unit 61 determines that an operation mode is the operation mode illustrated in FIG. 4. Finally, when the grip determining unit determines that the housing 50 is not gripped by the user, the control unit 61 determines that an operation mode is the operation mode illustrated in FIG. 5.

In addition, when the touch position is notified from the touch position detecting unit 65, the operation mode is determined. However, the control unit 61 may determine an operation mode when the pressing amount detecting unit 66 detects a pressing amount.

The pressing amount detecting unit 66 acts as a press detecting means and is connected to the press sensor unit 20 of the display input unit 10. The pressing amount detecting unit 66 receives an input of a pressing amount detection signal from the press sensor unit 20. Each pressing amount detection signal is outputted from the electrodes 202 and 203 according to a potential difference produced in the piezoelectric film 201 which is curved when the user's finger presses the operation surface 51 as described above. In the memory 62, a signal level of each pressing amount detection signal and a pressing amount are associated and stored. The pressing amount detecting unit 66 reads from the memory 62 the pressing amount associated with the signal level of the inputted pressing amount detection signal.

Further, the pressing amount detecting unit 66 determines whether or not the pressing amount read from the memory 62 exceeds a threshold. This threshold takes a respective value set for each operation mode described with reference to FIGS. 3, 4 and 5. When the pressing amount exceeds the threshold, the pressing amount detecting unit 66 notifies the control unit 61 that a user's pressing operation has been accepted. When the pressing amount does not exceed the threshold, the pressing amount detecting unit 66 does not accept a user's pressing operation and does not notify the control unit 61 of the pressing operation.

The threshold adjusting unit 67 operates as an adjusting means and changes the threshold used by the pressing amount detecting unit 66 according to a result of the operation mode determination performed by control unit 61. More particularly, when the operation mode is determined as the operation mode illustrated in FIG. 3, the threshold adjusting unit 67 sets the threshold used by the pressing amount detecting unit 66 to a threshold A. When the operation mode is determined as the operation mode illustrated in FIG. 4 or 5 as a result of determination performed by the grip determining unit 63, the threshold adjusting unit 67 sets the threshold used by the pressing amount detecting unit 66 to a threshold B (<A). That is, the threshold adjusting unit 67 lowers the threshold in case where a pressing operation is performed by the finger of the hand which does not grip the housing 50 compared to a threshold in case where a pressing operation is performed by the finger of the hand which grips the housing 50 to make it easy to detect the pressing operation.

When a touch operation is performed, the operation signal output unit 68 outputs an operation signal allocated to this touch operation. When, for example, a touch operation is performed on the operation image 101, the operation signal output unit 68 outputs an operation signal corresponding to this operation image 101, to the CPU or the like which controls the entire mobile terminal device 1.

Figure 7:
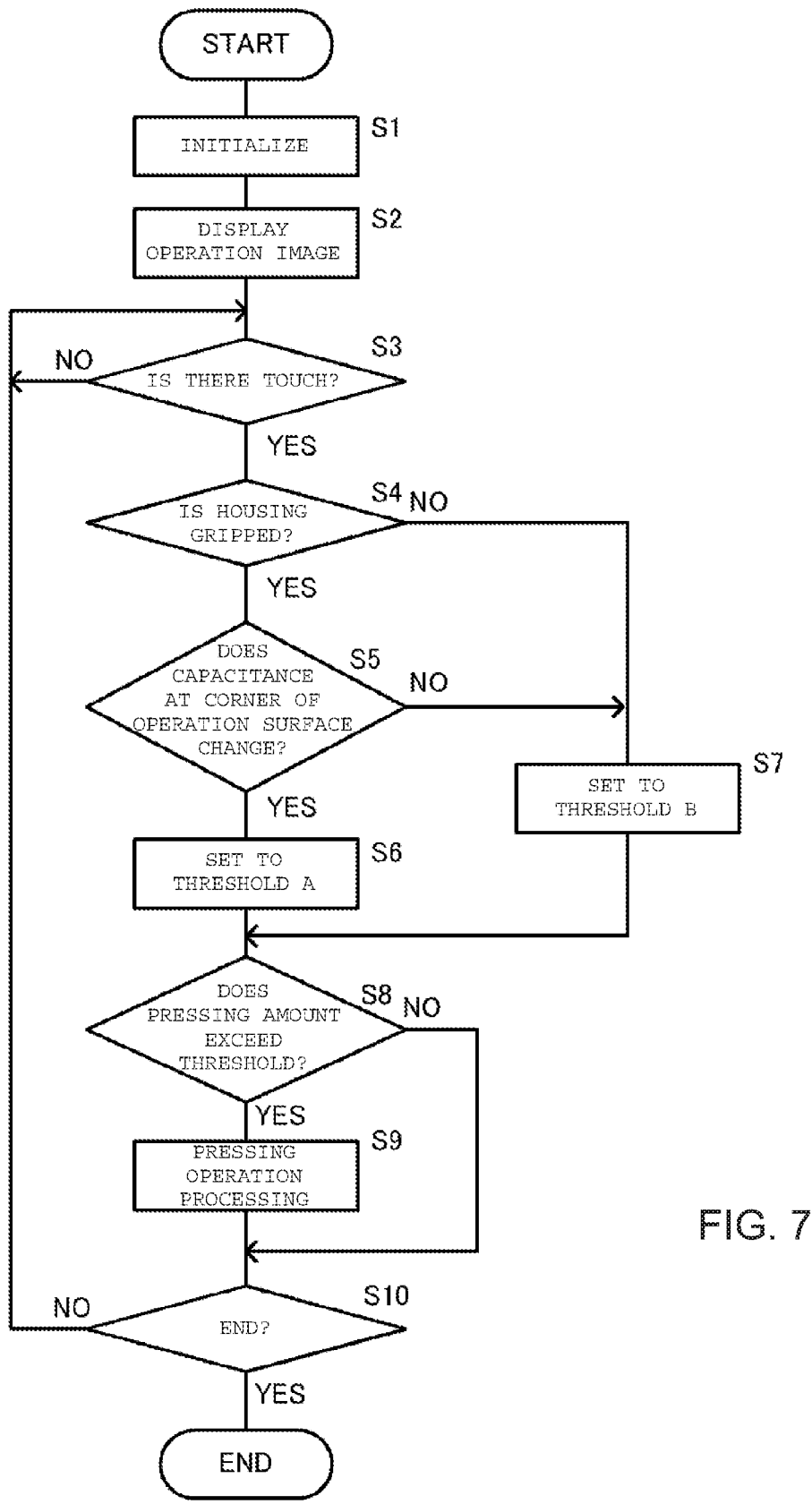
FIG. 7 is a flowchart of processing executed by the arithmetic circuit module.

FIG. 7 is a flowchart of processing executed by the arithmetic circuit module 60.

The control unit 61 performs initialization such as clearing of the RAM (S1), controls the display control unit 64 and displays the operation images 101, 102, and 103 or the like (S2). Next, the control unit 61 determines whether the operation surface 51 has been touched by receiving a notification from the touch position detecting unit 65 (S3). The touch on the operation surface 51 described herein refers to a fact that the user touches the operation surface 51 by the finger or via a capacitance produced between the operation surface 51 and the finger. When the operation surface 51 is not touched (S3: NO), the control unit 61 returns to processing in S3. In case where the operation surface 51 has been touched (S3: YES), the control unit 61 determines whether or not the housing 50 is being gripped by the user (S4).

When it is determined in S3 that the operation surface 51 has been touched, the control unit 61 executes operation processing corresponding to a touch operation of this touch. More specifically, when the touch position matches with a display position of one of the operation images 101, 102 and 103, the control unit 61 executes operation processing associated with the operation image displayed at the touch position.

When the housing is not gripped (S4: NO), the control unit 61 determines that the operation mode is the operation mode illustrated in FIG. 5, and causes the threshold adjusting unit 67 to set to the threshold B the threshold used for detecting a pressing operation (S7). When the housing is gripped (S4: YES), the control unit 61 determines whether or not the touch position detecting unit 65 has detected a change in a capacitance equal to or more than a certain value at the corner of the operation surface 51 (S5). When the change in the capacitance is not detected (S7: NO), the control unit 61 determines that the operation mode is the operation mode illustrated in FIG. 4, and causes the threshold adjusting unit 67 to set to the threshold B the threshold used for detecting a pressing operation (S7).

In case where the touch position detecting unit 65 has detected the change in the capacitance at the corner of the operation surface 51 (S5: YES), the control unit 61 determines that the operation mode is the operation mode illustrated in FIG. 3, and causes the threshold adjusting unit 67 to set to the threshold A the threshold used for detecting a pressing operation (S6).

The pressing amount detecting unit 66 determines whether or not the detected pressing amount exceeds the set threshold (S8). When the pressing amount exceeds the threshold (S8: YES), the pressing amount detecting unit 66 accepts a pressing operation, and the control unit 61 executes processing corresponding to the accepted pressing operation (S9). When the pressing amount does not exceed the threshold (S8: NO), the pressing amount detecting unit 66 does not accept a pressing operation and the control unit 61 executes processing in S10.

The control unit 61 determines whether or not the processing is finished, for example, the mobile terminal device 1 is powered off (S10). When the control unit 61 does not finish the processing (S10: NO), the processing returns to S3. When the control unit 61 finishes the processing (S10: YES), this processing is finished.

As described above, a pressing force with respect to the operation surface 51 changes according to a gripping mode regarding whether or not the housing 50 is gripped. However, by changing a pressing force detection sensitivity according to this gripping mode, it is possible to reliably detect a user's pressing operation. As a result, it is possible to precisely accept a user's pressing operation irrespectively of a posture upon a user's operation, so that the user can reliably operate the mobile terminal device 1.

In addition, when, for example, the mobile terminal device 1 includes an acceleration sensor, a vibration sensor or the like, whether or not the housing 50 is gripped by the user may be determined by causing the acceleration sensor to detect an inclination or vibrations of the housing 50.

The invention claimed is:

1. An input device, comprising:
a housing having opposed side surfaces;
an operation panel extending between the opposed side surfaces and coupled to the housing;
a processor for controlling the operation of the device, the microprocessor being programmed to carry out the following algorithm:
  (a) selecting a threshold level of pressing force applied to the operation panel as a function of whether a user has or has not gripped the opposed side surfaces of the housing and where the user touches a surface of the operation panel;
  (b) determining if the user has applied a pressing force to the surface of the operation panel which is greater than the threshold level of pressing force; and, if so;
  (c) carrying out a user initiated process.

2. The input device according to claim 1, wherein the processor:
  (a) selects the threshold level of pressing force to be at a first level when the user has gripped the opposed side surfaces of the housing and touches a predetermined portion of the surface of the operation panel; and
  (b) selects the threshold level of pressing force to be a second level, lower than the first level, when the user has gripped the opposed side surfaces but has not touched the predetermined portion of the surface of the operation panel.

3. The input device according to claim 2, wherein the processor also selects the threshold level of pressing force to be at the second level when the user has not gripped the opposed side surfaces of the housing.

4. The input device according to claim 1, wherein the processor selects the threshold force in response to the user touching the surface of the operation panel.

5. The input device according to claim 1, further including a capacitance sensor whose capacitance changes as the user's hand approaches the surface of the operation panel and the processor determines that the user has touched the surface of the operation panel by detecting a change in the capacitance.

6. The input device according to claim 1, further comprising:
side surface capacitive sensors located on the opposed side surfaces of the housing, the capacitance of the side surface capacitive sensors changing when the user grips the opposed side surfaces;
operation panel capacitive sensors having an output indicative of where the user touches the surface of the operation panel;
pressure sensor having an output indicative of how much pressure a user is applying to the surface of the operation panel.

7. The input device according to claim 6, wherein the processor receives the outputs of the side surface capacitive sensors and the operation panel capacitance sensors and selects the threshold level of pressing force as a function thereof.

8. The input device according to claim 7, wherein the processor further receives the output of the pressure sensor and determines if the user has applied a pressing force to the operation panel which is greater than the threshold level of pressing force as a function thereof.

9. The input device according to claim 6, wherein the pressure sensor includes a piezoelectric film provided along one surface of the operation panel, the film being made of a chiral polymer.

10. The input device according to claim 9, wherein the chiral polymer is polylactic acid.

11. The input device according to claim 10, wherein the chiral polymer is poly-L-lactic acid.

12. A non-transitory computer readable medium having stored thereon a computer program which, when run on a processor of an input device having an operation panel and a housing with opposed side surfaces, the operation panel extending between the opposed side surfaces, causes the processor to:
select a threshold level of pressing force applied to the operation panel as a function of both whether a user has or has not gripped the opposed side surfaces of the housing and where the user touches a surface of the operation panel;
determine if the user has applied a pressing force to the surface of the operation panel which is greater than the threshold level of pressing force; and, if so
carry out a user initiated process.

13. The non-transitory computer readable medium according to claim 12, wherein the program causes the processor to:
  (a) select the threshold level of pressing force to be at a first level when the user has gripped the opposed side surfaces of the housing and touches a predetermined portion of the surface of the operation panel; and
  (b) select the threshold level of pressing force to be a second level, lower than the first level, when the user has gripped the opposed side surfaces but has not touched the predetermined portion of the surface of the operation panel.

14. The non-transitory computer readable medium according to claim 13, wherein the program causes the processor to select the threshold level of pressing force to be at the second level when the user has not gripped the opposed side surfaces of the housing.

15. The non-transitory computer readable medium according to claim 13, wherein the program causes the processor to select the threshold force in response to the user touching the surface of the operation panel.

16. A process for determining whether a pressing force of sufficient magnitude has been applied to a surface of an operation panel forming part of an input device, the input device having a housing with two opposed side surfaces, the surface of the operation panel extending between the two opposed side surfaces of the housing, the process comprising:

(a) selecting a threshold level of pressing force applied to the surface of the operation panel as a function of both whether a user has or has not gripped the two opposed side surfaces of the housing and where the user touches the surface of the operation panel;

(b) determining if the user has applied a pressing force to the surface of the operation panel which is greater than the threshold level of pressing force; and, if so (c) carrying out a user initiated process.

17. The process according to claim 16, wherein the threshold level of pressing force is selected to be at a first level when the user has gripped the opposed side surfaces of the housing and has touched a predetermined portion of the surface of the operation panel, and is selected to be a second level, lower than the first level, when the user has gripped the opposed side surfaces but has not touched the predetermined portion of the surface of the operation panel.

18. The process according to claim 17, wherein the threshold level of pressing force is also selected to be at the first level when user has not gripped the opposed side surfaces of the housing.

19. The process according to claim 16, wherein the threshold level of pressing force is selected in response to the user touching the surface of the operation panel.

* * * * *